United States Patent
Schelhaas

(10) Patent No.: US 11,728,663 B2
(45) Date of Patent: Aug. 15, 2023

(54) DRONE RECHARGING STATION

(71) Applicant: Sunstone IP Systems Limited, Kent (GB)

(72) Inventor: Paul Schelhaas, Kent (GB)

(73) Assignee: Sunstone IP Systems Limited, Kent (GB)

( * ) Notice: Subject to any disclaimer, the term of this patent is extended or adjusted under 35 U.S.C. 154(b) by 325 days.

(21) Appl. No.: 17/276,576

(22) PCT Filed: Jul. 24, 2019

(86) PCT No.: PCT/GB2019/052070
§ 371 (c)(1),
(2) Date: Mar. 16, 2021

(87) PCT Pub. No.: WO2020/021258
PCT Pub. Date: Jan. 30, 2020

(65) Prior Publication Data
US 2022/0052538 A1    Feb. 17, 2022

(30) Foreign Application Priority Data

Jul. 24, 2018   (GB) ...................... 1812065

(51) Int. Cl.
*H01M 10/46* (2006.01)
*H02J 7/00* (2006.01)
(Continued)

(52) U.S. Cl.
CPC .......... *H02J 7/0044* (2013.01); *B64C 39/024* (2013.01); *H02J 7/0013* (2013.01);
(Continued)

(58) Field of Classification Search
CPC .......... H02J 7/0042; H02J 7/0013; H02J 7/35; H02J 50/10; H02J 2310/22; B64U 50/19; B64U 80/00; B64C 39/024
(Continued)

(56) References Cited

U.S. PATENT DOCUMENTS

| 8,511,606 B1 | 8/2013 | Lutke et al. |
| 11,455,896 B2 * | 9/2022 | Speasl ..................... B64F 1/222 |
| 2016/0364989 A1 | 12/2016 | Speasl et al. |

FOREIGN PATENT DOCUMENTS

| CN | 206914661 U | 1/2018 |
| EP | 3288140 A1 | 2/2018 |

(Continued)

OTHER PUBLICATIONS

International Search Report and Written Opinion received in PCT/GB2019/052070 dated Nov. 22, 2019, pp. 11.

*Primary Examiner* — Edward Tso
(74) *Attorney, Agent, or Firm* — Liang & Hennessey LLP; Brian Hennessey

(57) ABSTRACT

A drone recharging station comprising a housing carried by a base; one or more photovoltaic panels carried by the housing; an electrical energy storage assembly located within the housing, the electrical energy storage assembly having an electrical input and an electrical output, wherein the or each photovoltaic panel is electrically connected to the electrical input of the electrical energy storage assembly; a drone receiving platform carried by the housing which is configured to receive thereon a drone; and a power coupling electrically connected to the electrical output of the electrical energy storage assembly, wherein the power coupling transfers electrical energy from the electrical storage assembly to a drone in use.

24 Claims, 1 Drawing Sheet

Figure 1:
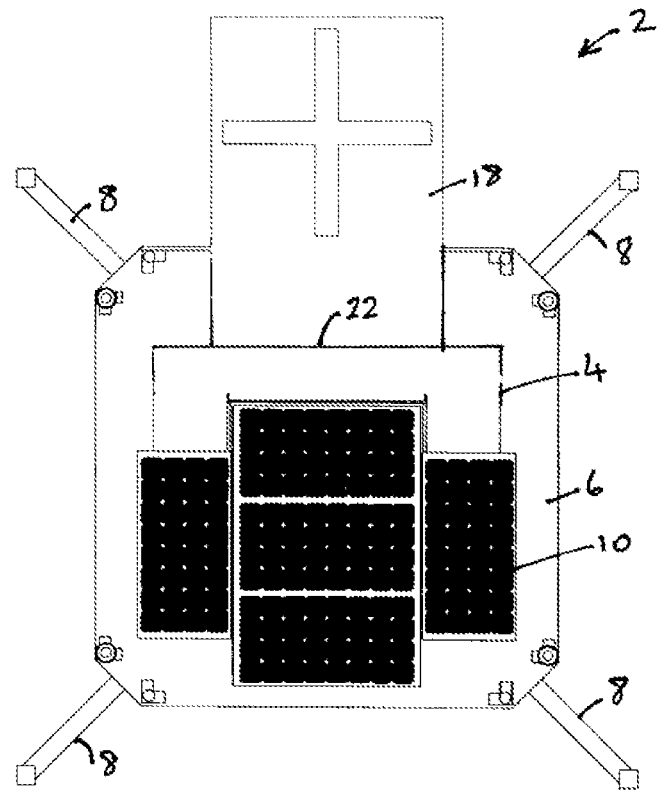

(51) Int. Cl.
*B64C 39/02* (2023.01)
*H02J 7/35* (2006.01)
*H02J 50/10* (2016.01)
*B64U 50/19* (2023.01)
*B64U 80/00* (2023.01)

(52) U.S. Cl.
CPC .............. *H02J 7/0042* (2013.01); *H02J 7/35* (2013.01); *B64U 50/19* (2023.01); *B64U 80/00* (2023.01); *H02J 50/10* (2016.02); *H02J 2310/22* (2020.01)

(58) Field of Classification Search
USPC .......................... 320/107, 108, 114, 115, 101
See application file for complete search history.

(56) References Cited

FOREIGN PATENT DOCUMENTS

EP           3340423 A1    6/2018
WO    WO-2016205415 A1 *  12/2016  ........... B64C 39/024

\* cited by examiner

DRONE RECHARGING STATION

The present invention relates to a drone recharging station, in particular for use in remote locations.

Drones or "unmanned aerial vehicles" are becoming more common and their uses more varied. It is also known to hold drone races, where drones are raced against each other around circuits.

Although some drones are powered by an internal combustion engine, the majority of drones currently available are powered by one or more electric motors and the time for which the drone can be used is determined by the electrical energy that can be stored in an on-board battery system.

As drones are typically used in remote areas, it may be difficult to recharge the drone when its on-board battery becomes drained.

According to a first aspect of the invention, there is provided a drone recharging station comprising a housing carried by a base; one or more photovoltaic panels carried by the housing; an electrical energy storage assembly located within the housing, the electrical energy storage assembly having an electrical input and an electrical output, wherein the or each photovoltaic panel is electrically connected to the electrical input of the electrical energy storage assembly; a drone receiving platform carried by the housing which is configured to receive thereon a drone; and a power coupling electrically connected to the electrical output of the electrical energy storage assembly, wherein the power coupling transfers electrical energy from the electrical storage assembly to a drone in use. In other words, the power coupling is capable of transferring electrical energy to a drone and/or is configured to transfer electrical energy to a drone.

Thus, the drone recharging station is solar powered and may be used in remote areas.

The housing may be small enough to be transported with the drone, it may include a wheeled base which may be towed to the desired location or it may form a permanent or semi-permanent recharging station located at a remote location. The recharging station may be capable of charging multiple drones or charging one or more drones on multiple occasions. This may be useful where a substantially continuous drone coverage is desired.

In embodiments in which the recharging station may form a permanent or semi-permanent charging station, the base may be configured with lifting hooks and/or apertures so that it may be transported on a truck or similar vehicle to the desired location. By the term "permanent or semi-permanent" it is meant that the charging station may be transported to a remote location and then remain there for a period of time, such as a week, a month, several months, a year or more than a year. In such cases, the station suitably operates autonomously and requires little or no maintenance.

Suitably, the electrical energy storage assembly includes one or more rechargeable batteries. Rechargeable batteries are well known and readily commercially available. For example, it is possible to select one or more rechargeable batteries having the desired output characteristics, charging characteristics and/or cycling characteristics. As the or each rechargeable battery is intended to operate in an outdoor environment, the or each battery may be enclosed within a polymeric barrier layer. Such a layer protects the battery and provides a thermal insulating layer which helps to minimise variations in temperature within the battery.

It is well known that battery performance may be reduced in cold conditions. Accordingly the housing within which the or each rechargeable battery is located may itself be thermally insulated. The thermal insulation may be in the form of an air gap between an outer wall of the housing and an inner wall of the housing, in the form of conventional insulation materials secured to a wall of the housing, in the form of a conventional insulation material located between an outer wall of the housing and an inner wall of the housing, or combinations thereof.

Furthermore, it may be desired to operate the station in hot conditions. In such embodiments, the thermally insulated housing may function to keep the interior of the housing cool. The housing may include one or more fans and/or a cooling system in order to maintain the interior temperature of the housing below a threshold temperature.

In an embodiment of the invention, the electrical energy storage assembly includes a power input conditioner which conditions the electrical energy generated by the or each photovoltaic panel to a voltage and/or current which is suitable for supply to the or each battery. Photovoltaic panels may produce electrical energy in a form (voltage and/or current) which is not ideally suited to charging the or each battery and the conditioner may convert the electrical energy to a form which is better suited for charging the or each battery with electrical energy.

Similarly, the electrical energy storage assembly may include a power output conditioner which conditions the electrical energy supplied by the or each battery to a voltage and/or current which is suitable for supply to a drone. In this embodiment, the power output from the electrical energy storage assembly may be converted to a form which is best suited to recharge a drone. The power output conditioner may be capable of varying the voltage and/or current from the electrical energy storage assembly according to the requirements of different drones.

In an embodiment of the invention, the power coupling forms one part of an inductive charging arrangement and includes an induction coil configured to generate an alternating electromagnetic field. In such embodiments, the drones to be recharged would also include an induction coil (a second induction coil), which would convert the alternating electromagnetic field back into electrical energy, which in turn is supplied to the on-board battery of the drone in order to re-charge it.

Inductive charging systems are useful, as they reduce the need for leads to be connected from the recharging station to the drone. For example, with an inductive charging system, it would be possible to re-charge a drone with no human operator being present: the drone could be landed on the receiving platform and recharged in situ. It could then take off again when fully recharged. In such embodiments, the first induction coil may be carried by the receiving platform.

Additionally or alternatively, the power coupling may include an electrical charging lead which terminates in an electrical plug or socket, wherein the electrical charging lead is configured to connect to a corresponding electrical input socket or plug of drone power supply. Such an arrangement would require a user to be present in order to connect the power coupling to the drone. However, it provides a more efficient re-charging system compared to an inductive charging arrangement and it allows the drone to be landed near to the recharging station, whereupon it may be manually moved to the receiving platform. This requires less skill from the drone operator than trying to land the drone on the receiving platform.

In embodiments in which the power coupling includes an electrical charging lead, the lead may be stored within the housing when not in use. This provides an additional level of security.

In a further embodiment, the drone recharging station includes a cable arrangement including a tether cable, to which a drone is attached, and an electrical cable which electrically connects the drone's power system to an electrical output of the electrical energy storage system located within the housing. In this way, a drone connected to the cable arrangement is able to fly within the constraints of the tether cable and needs not be charged. Accordingly, the drone is able to fly for several hours, days or longer while it is powered by the electrical energy storage assembly located within the housing.

The drone receiving platform may extend horizontally outwards from the housing. Such an arrangement allows for one or more photovoltaic panels to be located on the top (roof panel) of the housing. Optionally, the drone receiving platform is hingedly coupled to the housing and has a use configuration in which the platform extends horizontally outwards from the housing; and a transport configuration in which the platform lies parallel to a respective side wall of the housing. In other words, the receiving platform may be hinged downwards from its use configuration until it is substantially parallel to a respective one of the housing side walls (i.e. hinged from a substantially horizontal configuration to a substantially vertical configuration) for transportation of the station. It may then be hinged upwards for use. The drone receiving platform may include a latch apparatus or a lock apparatus such that it can be latched or locked in its use configuration and/or its transport configuration.

Alternatively, the drone receiving platform may be carried by the top panel of the housing and the or each photovoltaic panels are carried by one or more side walls of the housing. Such an arrangement provides a more compact arrangement for the charging station.

The housing may be sized to accommodate therein one or more drones when not in use. In other words, the housing may include a drone storage chamber. In such embodiments, the drone storage chamber may include an opening which permits a drone to pass therethrough. Such an opening may be on the top of the housing. The opening to the chamber may be a manually operated door or it may be an electrically, hydraulically or pneumatically operated door. It will be appreciated that a door which is electrically, hydraulically or pneumatically operated may be opened and/or closed remotely.

The drone recharging station may comprise two or more photovoltaic panels. In such embodiments, the drone recharging station may comprises at least one fixed photovoltaic panel and at least one movable photovoltaic panel which has a variable orientation. The fixed panel, where present, suitably has a substantially vertical orientation, e.g. within about 10° of a vertical plane. According to an embodiment of the invention, the drone recharging station may comprise one or more photovoltaic panels which is/are adapted to have a variable orientation. The drone recharging station suitably includes two or more photovoltaic panels. The term "variable orientation" means that at least one of the panels may be mounted for movement, such as rotation, relative to a fixed plane, such as a vertical plane. In this way, the panels may be moved periodically for optimum solar performance.

In embodiments of the invention in which one or more panels is mounted for variable orientation, the or each panel may include a motor adapted to move the panel from a first orientation to a second orientation. In this embodiment, the motor may be controlled such that the orientation of the panel tracks the position of the sun in the sky to provide a desired amount of solar irradiation. Alternatively, the motor may be controlled to move the respective panel periodically. The motor may include a controller which may be adapted to receive a control signal such that the orientation of the respective panel may be controlled remotely.

The fixed panels, where present suitably prevent or resist an accumulation of snow or other solid contaminant (such as sand or dust) on the panel. Thus, even though a vertical or near vertical orientation may not provide an optimum solar performance, such panels are nevertheless still able to generate electrical energy when other panels may be compromised by foreign matter, such as snow, sand, dirt or dust.

Suitably, in embodiments in which at least one of the photovoltaic panels is configured to have a variable orientation, the or each photovoltaic panel may have an operational orientation in which it is arranged for optimum solar strike (i.e. is arranged to receive a desired level of solar energy) and it may have a transport orientation in which the or each panel is arranged to lie parallel and adjacent to a wall of the housing.

In order to protect the photovoltaic cells carried by the photovoltaic panels, the or each photovoltaic panel may be coated with protective barrier layer formed from a glass material or a polymeric material. Suitably, the protective barrier layer does not reduce or impair the intensity of the light which strikes the photovoltaic cells. Thus, it does not reduce the efficiency or electrical output of the photovoltaic panel. The protective barrier layer is suitably a hydrophobic material.

At least one of the photovoltaic panels may be flexible. This allows for solar performance across a wide range of solar positions.

The photovoltaic panel(s) of the drone recharging station are suitably the sole source of electrical energy. Thus, the housing suitably does not include an electrical power generator that requires maintenance or fuel, such as an internal combustion engine. In this way, the drone recharging station is able to generate electrical energy for long periods of time with little or no maintenance.

In an embodiment of the invention, the drone recharging station further includes a GPS location device electrically connected to the electrical output from the electrical energy storage assembly. The GPS location device allows the precise location of the remote power source to be known at any time. The GPS location device may be used to guide a drone to the drone recharging station.

Additionally or alternatively, the drone recharging station may include a radio transmitter. The radio transmitter may be used to direct the drone to the recharging station in embodiments in which the drone is not tethered to the housing.

In a further embodiment of the invention, the drone recharging station may provide a connection to a wireless communications network. In such an embodiment, the house may carry or house a wireless communications apparatus which is electrically connected to and powered by the electrical output of the electrical energy storage assembly and which is configured for connection to the wireless communications network. As part of the wireless communications apparatus, the station may include a wireless communications transmitter/receiver. Such component(s) are suitably located within the housing. The wireless communication apparatus may receive or transmit data from or to a drone being recharged by the station. Additionally or alternatively, the wireless communication apparatus may transmit data relating to the performance of the electrical energy storage assembly and/or the photovoltaic panels.

Such data may allow the station to be serviced, for example by replacing one or more of the batteries or cleaning the photovoltaic panel(s).

Furthermore, the wireless communications apparatus may permit the remote control of a drone which is tethered to the housing or which is desired to fly in an area surrounding the station. Thus, remote signals may be transmitted to the station, via the wireless communication network and are then transmitted from the station to the drone.

The skilled person will appreciate that the features described and defined in connection with the aspect of the invention and the embodiments thereof may be combined in any combination, regardless of whether the specific combination is expressly mentioned herein. Thus, all such combinations are considered to be made available to the skilled person.

Figure 2:
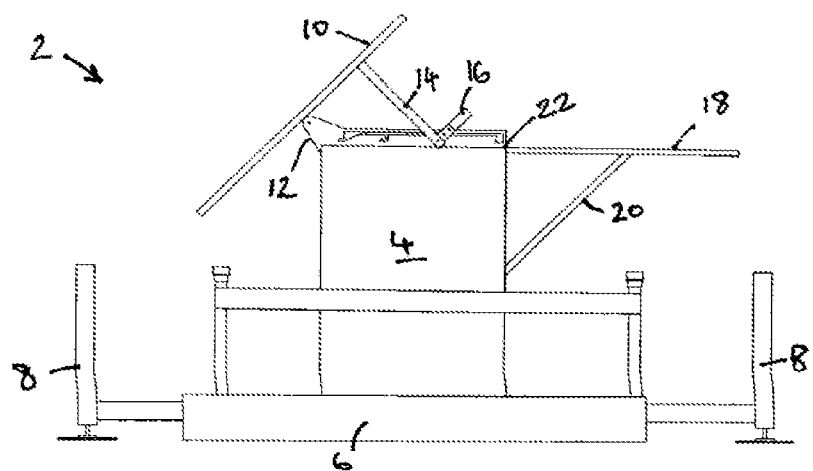

An embodiment of the invention will now be described, by way of example only, with reference to the accompanying drawings in which:

FIG. 1 is a plan view from above of an embodiment of a drone recharging station according to the first aspect of the invention; and FIG. 2 is a side elevational view of the drone recharging station shown in FIG. 1.

For the avoidance of doubt, the skilled person will appreciate that in this specification, the terms "up", "down", "front", "rear", "upper", "lower", "width", etc. refer to the orientation of the components as found in the example when installed for normal use as shown in the Figures.

The embodiment of the invention shown in FIGS. 1 and 2 show a drone recharging station 2 comprising a housing 4 carried by a base 6.

The base 6 is supported by four outwardly extending legs 8 to provide the housing with additional security.

The skilled person will appreciate that the drone recharging station 2 shown in the Figures is intended to be a permanent or semi-permanent station, as the base is not wheeled and the station 2 is intended to be transported on the back of a flat-bed lorry or similar transport vehicle.

Five photovoltaic panels 10, which together are capable of generating 500W of power, are carried by the housing 4. It will be noted that the photovoltaic panels 10 are shown in the figures as being arranged in a substantially planar array. However, the photovoltaic panels 10 may be arranged in any number of different configurations and may include a mixture of moveable panels and fixed panels.

As shown in FIG. 2, the photovoltaic panels 10 are mounted for rotation about a pivot 12, which allows the angle of the panels 12 relative to the top surface of the housing 4 to be varied. The ability to vary the angle of the panels 10 allows an optimum light-strike on the panels 10 to be obtained. The panels 10 are moved via an adjustment arm 14, which in turn is connected to an electric motor (not shown) by an orientation rod 16. The orientation rod 16 is rotated by the motor, which causes a corresponding movement of the adjustment arm 14 and the change in angle of the panels 10.

The interior of the housing 4 is sized to receive therein a plurality of rechargeable batteries (not shown) and an input controller (not shown) to control the flow of electrical energy to the batteries from the photovoltaic panels 10. The rechargeable batteries can be any known type of rechargeable batteries, but as the station 2 is intended for outdoor use in a variety of different ambient conditions, the batteries are encased in a polymeric insulating material. The casing for the batteries further includes an exhaust conduit to prevent the build-up of any gases generated by the recharging of the batteries in use. The exhaust conduit passes through a wall of the housing 4 so that the gases may be vented to the external environment. The skilled person will appreciate that input controllers which condition the electrical energy from the photovoltaic panels 10 are well known and need not be described in detail herein.

The housing 4 may be insulated. In such embodiments, the housing 4 may include a double-skinned wall, wherein the insulation is provided by an air gap between the skins of the walls. Instead of an air gap, an insulation material may be located between the skins of the walls.

Alternatively, each wall of the housing 4 may include an insulation material laminated to the inside and/or outside surface of each wall.

The rechargeable batteries are electrically connected to an output from the photovoltaic panels 10 via the input controller. The input controller conditions the electrical energy received from the panels 10 and the conditioned electrical energy is stored by the rechargeable batteries for use in recharging the on-board battery or batteries of a drone.

The housing 4 further carries a drone landing platform 18. The landing platform 18 comprises a substantially planar rectangular sheet which is hinged to an upper portion of the housing 4 via a hinge 22 provided along one of the side edge portions of the platform 18. A support arm 20 connects an intermediate portion of the platform 18 to the housing 4.

Embedded within the platform 18 is an induction coil (not shown) which is electrically connected to the or each rechargeable batteries via an output controller (not shown) located within the housing 4. The output controller conditions the electrical energy from the rechargeable batteries to generate a desired alternating electromagnetic field from the induction coil. As with the input controllers, suitable output controllers are also well known to those skilled in the art of conditioning or controlling a flow of electrical energy.

The platform carries one of more sensors (not shown) which sense the presence of a drone on the landing platform 18. Such sensors may include load sensors which detect the weight of a drone on the platform 18, proximity sensors, such as ultrasonic sensors which detect the proximity of a drone to the platform 18, or any other suitable type of sensor. The or each sensor is electrically connected to the output controller such that the output controller only connects the induction coil carried by the platform 18 to the batteries within the housing 4 when a drone is sensed on the platform 18. Such an arrangement minimises energy wastage and the undesired draining of electrical energy from the batteries when a drone is not present on the platform 18.

A drone that is recharged from the station 2 includes a second induction coil connected to its on-board battery system. The second induction coil carried by the drone generates an electrical current when located within the alternating electromagnetic field generated by the induction coil carried by the platform 18. The generated electrical current is then used to recharge the on-board battery system of the drone.

When the drone has been recharged, it leaves the platform 18. The sensors of the platform detect the drone leaving the platform and isolate the induction coil from the rechargeable batteries.

The housing 4 may further have located therein a wireless communications access point (not shown) which is able to connect to a wireless network. In this way data from the station 2 can be transmitted to a remote location. The data may include, for example, the condition of the batteries, the charge remaining within the batteries, the electrical energy being generated by the photovoltaic panels 10, and such like.

Additionally or alternatively, the housing 4 may include a GPS receiver/transmitter (not shown) such that the precise location of the station 2 may be known.

The invention claimed is:

1. A drone recharging station comprising:
a housing carried by a base;
one or more photovoltaic panels carried by the housing;
an electrical energy storage assembly located within the housing, the electrical energy storage assembly having an electrical input and an electrical output, wherein the or each photovoltaic panel is electrically connected to the electrical input of the electrical energy storage assembly;
a drone receiving platform carried by the housing which is configured to receive thereon a drone;
one or more sensors carried by the drone receiving platform and configured to sense a presence of the drone on the drone receiving platform; and
a power coupling electrically connected to the electrical output of the electrical energy storage assembly, wherein the power coupling forms one part of an inductive charging arrangement and includes an induction coil configured to generate an alternating electromagnetic field, and wherein the power coupling is configured to transfer electrical energy from the electrical storage assembly to the drone in response to the presence of the drone being sensed on the drone receiving platform.

2. A drone recharging station according to claim 1, wherein the base is a wheeled base.

3. A drone recharging station according to claim 1, wherein the electrical energy storage assembly includes one or more rechargeable batteries.

4. A drone recharging station according to claim 3, wherein the electrical energy storage assembly includes a power input conditioner which conditions the electrical energy generated by the or each photovoltaic panel to a voltage and/or current which is suitable for supply to the or each battery.

5. A drone recharging station according to claim 3, wherein the electrical energy storage assembly includes a power output conditioner which conditions the electrical energy supplied by the or each battery to a voltage and/or current which is suitable for supply to a drone.

6. A drone recharging station according to claim 3, wherein the or each rechargeable battery is enclosed within a polymeric barrier.

7. A drone recharging station according to claim 1, wherein the housing is thermally insulated.

8. A drone recharging station according to claim 1, wherein the induction coil is carried by the drone receiving platform.

9. A drone recharging station according to any of claim 1, wherein the power coupling includes an electrical charging lead which terminates in an electrical plug or socket, wherein the electrical charging lead is configured to connect to an input of drone power supply.

10. A drone recharging station according to claim 9, wherein the electrical charging lead is secured within the housing when not in use.

11. A drone recharging station according to claim 1, wherein the power coupling includes an electrical cable which electrically connects the power supply of the drone to the electrically output of the electrical energy storage assembly.

12. A drone recharging station according to claim 11, wherein the electrical cable forms part of a cable arrangement which further includes a tether cable to tether a drone to the housing.

13. A drone recharging station according to claim 1, wherein the drone receiving platform extends horizontally outwardly from the housing.

14. A drone recharging station according to claim 13, wherein the drone receiving platform is hinged relative to the housing and has a use configuration in which the platform extends horizontally outwards from the housing; and a transport configuration in which the platform lies parallel to a respective side wall of the housing.

15. A drone recharging station according to claim 1, wherein the drone receiving platform is carried by a top panel of the housing and the or each photovoltaic panels are carried by one or more side walls of the housing.

16. A drone recharging station according to claim 1, wherein the photovoltaic panel(s) are the sole source of electrical energy.

17. A drone recharging station according to claim 1, wherein the housing carries two or more photovoltaic panels.

18. A drone recharging station according to claim 17, wherein the housing carries at least one fixed photovoltaic panel and at least one movable photovoltaic panel which has a variable orientation.

19. A drone recharging station according to claim 1, wherein the or each photovoltaic panel is flexible.

20. A drone recharging station according to claim 1, wherein the or each photovoltaic panel is coated with a polymeric barrier layer.

21. A drone recharging station according to claim 1, wherein the drone recharging station further includes a GPS location device electrically connected to the electrical output from the electrical energy storage assembly.

22. A drone recharging station according to claim 1, wherein the drone recharging station further includes a wireless communications receiver/transmitter.

23. A drone recharging station according to claim 1, wherein the housing defines therein a drone storage chamber, which is accessed via a door.

24. A drone recharging station according to claim 23, wherein the door is electrically, hydraulically or pneumatically operated.

* * * * *